US009755765B2

United States Patent
Dolgin et al.

(10) Patent No.: US 9,755,765 B2
(45) Date of Patent: Sep. 5, 2017

(54) MAGNETIC ANTENNAS FOR ULTRA LOW FREQUENCY AND VERY LOW FREQUENCY RADIATION

(71) Applicant: Raytheon Company, Waltham, MA (US)

(72) Inventors: Benjamin Dolgin, Alexandria, VA (US); Steven Cotten, Dumfries, VA (US); James C. Zellner, Centreville, VA (US)

(73) Assignee: RAYTHEON COMPANY, Waltham, MA (US)

( * ) Notice: Subject to any disclaimer, the term of this patent is extended or adjusted under 35 U.S.C. 154(b) by 278 days.

(21) Appl. No.: 14/311,558

(22) Filed: Jun. 23, 2014

(65) Prior Publication Data

US 2015/0372771 A1    Dec. 24, 2015

(51) Int. Cl.
| | |
|---|---|
| H04B 13/02 | (2006.01) |
| H01Q 7/06 | (2006.01) |
| H04B 5/00 | (2006.01) |
| H01Q 7/08 | (2006.01) |

(52) U.S. Cl.
CPC ............... *H04B 13/02* (2013.01); *H01Q 7/06* (2013.01); *H01Q 7/08* (2013.01); *H04B 5/0081* (2013.01); *Y10T 29/4902* (2015.01)

(58) Field of Classification Search
CPC .......... H01Q 7/06; H01Q 7/08; H01Q 21/245; H04B 5/0081; H04B 13/02
USPC ........................................... 455/40; 343/788
See application file for complete search history.

(56) References Cited

U.S. PATENT DOCUMENTS

| | | | |
|---|---|---|---|
| 2,375,593 A | | 5/1945 | Sontheimer et al. |
| 3,495,264 A | * | 2/1970 | Spears ..................... H01Q 1/36 336/184 |
| 3,721,989 A | * | 3/1973 | Christensen ............ H01Q 7/08 343/701 |
| 6,014,111 A | | 1/2000 | Johannessen |
| 7,637,161 B2 | | 12/2009 | Vornbrock et al. |
| 8,077,106 B2 | | 12/2011 | Sato |
| 2006/0284768 A1 | * | 12/2006 | Pauplis .................. H01Q 3/267 342/368 |

(Continued)

FOREIGN PATENT DOCUMENTS

EP    1122814 A2    8/2001

OTHER PUBLICATIONS

International Search Report and Written Opinion for PCT Application No. PCT/US2015/036334, dated Oct. 2, 2015, pp. 1-11.

*Primary Examiner* — Yuwen Pan
*Assistant Examiner* — Fatuma Sherif
(74) *Attorney, Agent, or Firm* — Cantor Colburn LLP

(57) ABSTRACT

A communication system and a method of fabricating a communication system are described. The communication system includes a transmit antenna including two or more symmetric coils wound around a closed-loop magnetic transmitter core, the transmit antenna configured to transmit an outgoing signal of very low frequency (VLF) or ultra low frequency (ULF) energy. The communication system also includes a receive antenna including two or more coils formed from two or more wires wound around a closed-loop magnetic receiver core, the receive antenna configured to receive transmitted VLF or ULF energy as an incoming signal. The communication system also includes a processor to process the outgoing signal and the incoming signal.

18 Claims, 5 Drawing Sheets

(56) References Cited

U.S. PATENT DOCUMENTS

| | | | |
|---|---|---|---|
| 2007/0232231 A1* | 10/2007 | Hessel | H04B 5/0093 455/41.1 |
| 2010/0238050 A1* | 9/2010 | Rhodes | H04B 13/02 340/850 |
| 2011/0076940 A1* | 3/2011 | Rhodes | H01Q 1/04 455/40 |
| 2013/0230094 A1* | 9/2013 | Eliezer | H04H 40/27 375/238 |

* cited by examiner

MAGNETIC ANTENNAS FOR ULTRA LOW FREQUENCY AND VERY LOW FREQUENCY RADIATION

BACKGROUND

The present disclosure relates to antennas and, more specifically, to magnetic transmission antennas for ultra-low frequency (ULF) or very low frequency (VLF) radiation.

Some applications require the use of very low frequency (3 to 30 kilo Hertz (kHz)) or ultra-low frequency (0.3 to 3 kHz) radiation. For example, mining operations require through the earth (TTE) communication. A mining operation may involve personnel positioned over 1000 feet underground. When an event (e.g., explosion) requiring emergency aid occurs in the subsurface environment, the personnel must be able to convey information about the event to the surface and must also be able to receive instructions from the surface. In such operations, any radiation above the VLF frequency range is absorbed by the earth.

SUMMARY

According to one embodiment, a communication system includes a transmit antenna including two or more symmetric coils wound around a closed-loop magnetic transmitter core, the transmit antenna configured to transmit an outgoing signal of very low frequency (VLF) or ultra low frequency (ULF) energy; a receive antenna including two or more coils formed from two or more wires wound around a closed-loop magnetic receiver core, the receive antenna configured to receive transmitted VLF or ULF energy as an incoming signal; and a processor configured to process the outgoing signal and the incoming signal.

According to another embodiment, a method of fabricating a communication system includes configuring a transmit antenna to include two or more symmetric coils around a closed-loop magnetic transmitter core and to the transmit an outgoing signal of very low frequency (VLF) or ultra low frequency (ULF) energy; configuring a receive antenna to include two or more coils formed from two or more wires wound around a closed-loop magnetic receiver core and to receive an incoming signal of VLF or ULF energy; and configuring a signal processing portion to process the outgoing signal and the incoming signal.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As noted above, some operations, such as those involving TTE communication, require transmission and reception of VLF or ULF radiation. Other exemplary applications involve communication through building walls, metal sheathing, and the like. Generally, the transmission antennas for VLF or ULF communication require a large number of coils or a large cross sectional area. One approach to a VLF or ULF transmitter has been the use of a large coil (on the order of up to 100 feet in diameter, for example) with a single loop of the wire coil to obtain a large cross sectional area. Another approach that also requires a long wire involves connecting the wire between two grounding points in the earth (whether at the surface or underground) with the grounding points being separated by distances in excess of 100 feet. In the subsurface environment, a large antenna may be difficult to deploy and may be more easily destroyed by an event such as an explosion. In addition, large coil antennas may have a strong directionality (orientation between the transmitter and receiver must match up to receive sufficient energy) but are difficult to adjust due to their size. Yet another approach that facilitates the use of a smaller coil (e.g., 2 feet in diameter) requires many turns of the coils such that the resulting antenna is heavy and requires a relatively large voltage to drive it. Embodiments of the systems and methods detailed herein relate to transmitter and receiver antennas for TTE communication.

Figure 1:
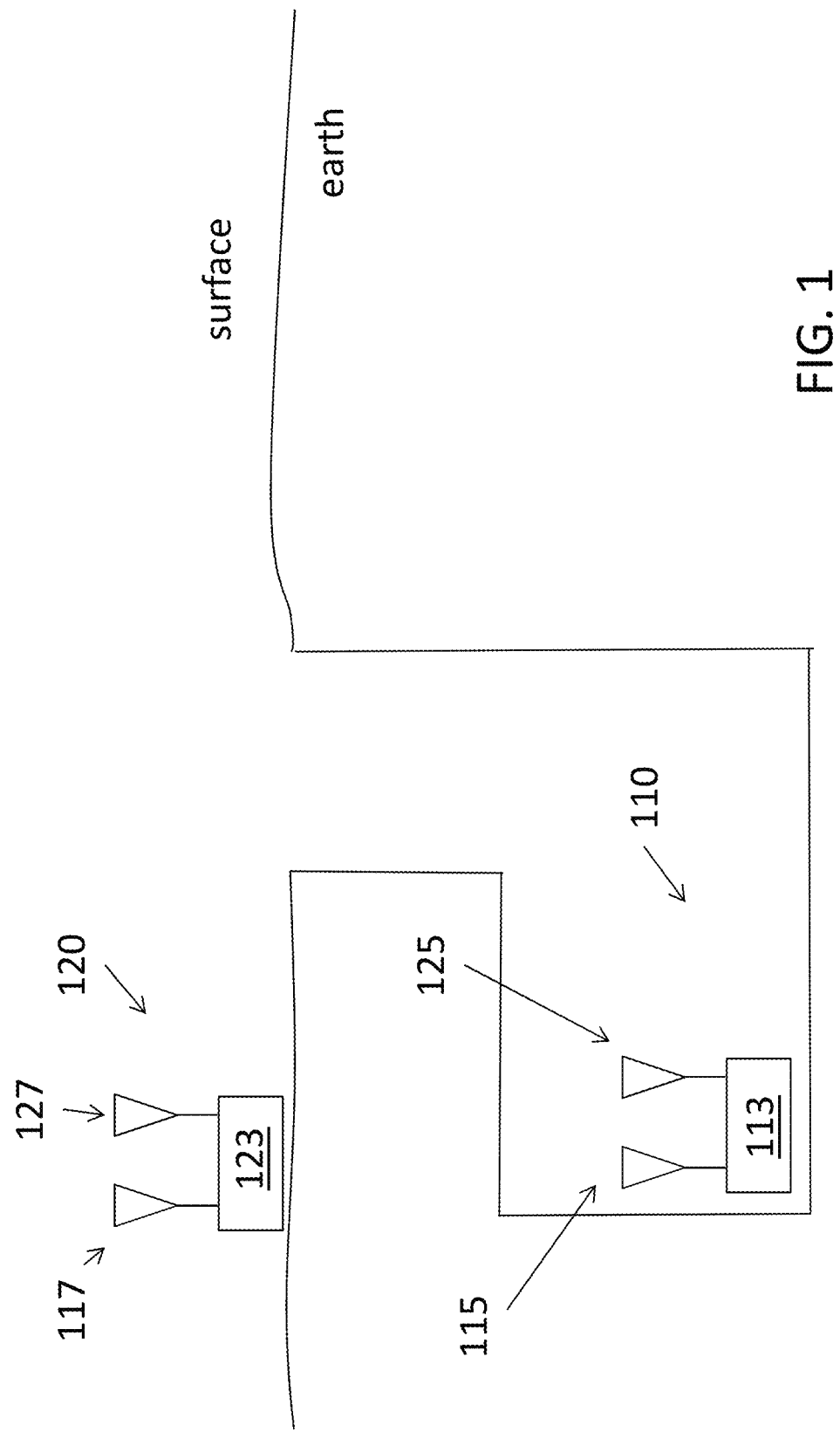
FIG. 1 is a block diagram of TTE communication according to an embodiment of the invention.

FIG. 1 is a block diagram of TTE communication according to an embodiment of the invention. Although TTE communication is shown and discussed as an exemplary environment in which VLF or ULF radiation would be used, the embodiments detailed herein are not limited to any particular location or environment. Further, the subsurface communication system 110 in particular is discussed with regard to embodiments of the transmit antenna 115 and receive antenna 125. However, the components of the subsurface communication system 110 may be located elsewhere in alternate embodiments. The systems shown in FIG. 1 are only for explanatory purposes and are not true representations of the size, depth, or shape of the components, which are further detailed below. A subsurface communication system 110 and a surface communication system 120 are shown. Both include a transmit antenna 115, 117, respectively, that transmits VLF or ULF radiation and a receive antenna 125, 127, respectively, that receives VLF or ULF radiation. The subsurface processor 113 processes signals for transmission to the surface communication system 120 or received signals, and the surface processor 123 processes signals for transmission to the subsurface communication system 110 or received signals. Both processors 113, 123 may include processors, memory devices that store instructions, an input interface, and an output interface (e.g., audio output). While the transmit antennas 115, 117 may be the same type of antenna, and the receive antennas 125, 127 may be the same type of antenna, the antennas may be different in the two different environments according to alternate embodiments. This is because the constraints that apply in the subsurface environment may not apply on the surface. For example, size is a consideration in the subsurface environment for several reasons. In addition, subsurface equipment may have to be made intrinsically safe (i.e., conform to inherent safety design standards) such that electrical current and voltage are kept relatively low, for example, or be small enough to fit in an explosion proof box such that higher power may be used. The subsurface transmit antenna 115 and receive antenna 125 are further detailed below.

Figure 2:
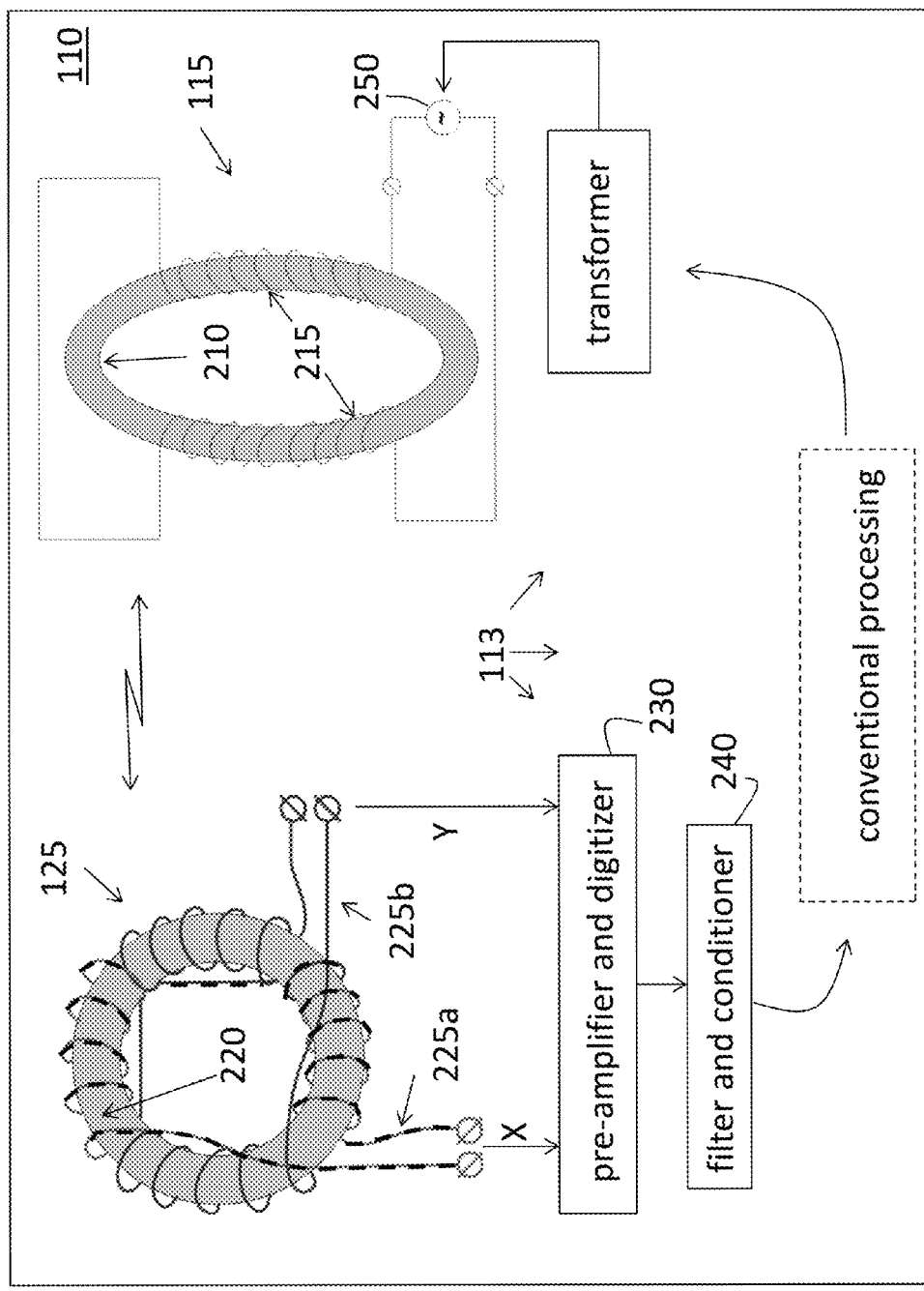
FIG. 2 details the subsurface communication system shown in FIG. 1 according to embodiments of the invention.

FIG. 2 details the subsurface communication system 110 shown in FIG. 1 according to embodiments of the invention. The transmit antenna 115 includes a closed-loop core 210 and symmetric coils of wire 215. The wire 215 may be a copper wire, for example, or another conductive wire carrying current from a source 250. The symmetry of the coils or windings of the wire 215 is such that there is an additive effect on the magnetic field generated on each side of the core 210. According to the exemplary orientation shown in FIG. 2, the coils of wire 215 on both sides of the core 210 generate a magnetic field going up. As FIG. 2 indicates, the core 210 may be oblong. In alternate embodiments, the core 210 may be a toroid or may be formed of c-shaped or u-shaped cores (c-core, u-core), for example. The core 210 is magnetic and may be comprised of a high-permeability magnetic material (e.g., permeability >>100). The symmetric windings may have the effect of two parallel high magnetic permeability (e.g., ferrite) rods of infinite length. The wire 215 may be 0.25 inches in diameter, for example, and may carry 20 to 30 Amperes (amps) of current. These exemplary values are not intended to be limiting but, instead, provide a general range of operation of the transmit antenna 115.

The receive antenna 125 also includes a toroid core 220, as shown in FIG. 2, and includes two or more pairs of coils formed by two different wires 225a, 225b. In alternate embodiments, the core 220 may be a closed-loop magnetic core of a different shape (e.g., square cross sectional shape). The core 220 may be comprised of a high-permeability magnetic material (e.g., permeability >>100). As shown in FIG. 2, for example, each pair of the two pairs of coils is arranged orthogonal to the other. The arrangement of the two sets of wires 225a, 225b addresses the directionality issue noted above. That is, if only one wire 225 were present, then the orientation of the receive antenna 125 with respect to the (surface) transmit antenna 117 would affect the strength of the received signal. When two pairs of coils are present, as in FIG. 2, the received signal out of the pre-amplifier and digitizer 230 at the filter and conditioner 240 is given by:

$$\text{Output Signal} = \sqrt{X^2 + Y^2} \quad [\text{EQ. 1}]$$

X represents the time-dependent signal intensity or voltage level induced in wire 225a, and Y represents the time-dependent signal intensity or voltage level induced in wire 225b. Thus, based on the arrangement of the coils of the two wires 225a, 225b (perpendicular to each other), the received signal (result of EQ. 1) is never zero. Depending on the orientation of the receiver antenna, the voltage generated in one wire 225a is maximum when the voltage generated in the other wire 225b is minimum and vice versa. As the relative orientation with the transmit antenna 117 changes from one extreme (where voltage generated in wire 225a is maximum) to the other (where voltage generated in wire 225b is maximum), the voltage generated in wire 225a decreases from the maximum value and the voltage generated in wire 225b increases up to the maximum value. That is, the signal given by EQ. 1 is X (at one extreme) or Y (at the other extreme) or some combination of the two voltages in the two wires 225a, 225b (between the two extremes) but is never null as a result of the relative orientation of the transmit antenna 117. In alternate embodiments, weightings may be applied to one or both of X and Y. That is, alternate embodiments of EQ. 1 include:

$$\sqrt{A \cdot X^2 + B \cdot Y^2} \quad [\text{EQ. 2}]$$

$$C\sqrt{X^2 + Y^2} \quad [\text{EQ. 3}]$$

A, B, and C are variables that may have any value greater than zero. If A, B, or C were zero, then the received signal could be zero based on the relative orientation of the transmit antenna 117 and the receive antenna 125 (in FIG. 1, for example). Other variations (e.g., a combination of EQ. 2 and EQ. 3) are also possible. For example, another alternate embodiment of EQ. 1 is given by:

$$\sqrt{A \cdot X^2 + B \cdot X \cdot Y + C \cdot Y^2} \quad [\text{EQ. 4}]$$

In the case of EQ. 4, A and C would be greater than zero (e.g., A and C are both 1) and B would be any real number (including zero).

Figure 3:
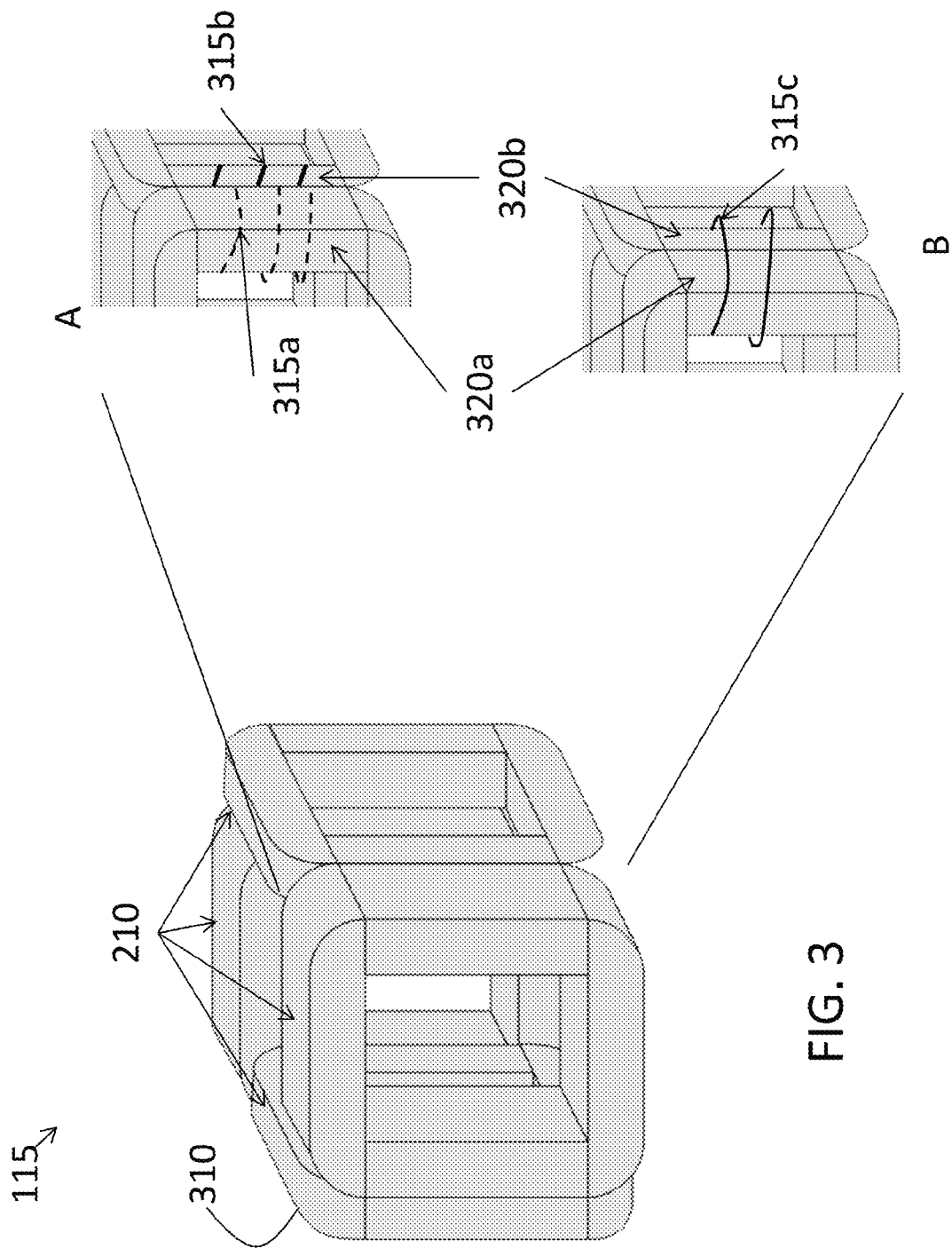
FIG. 3 illustrates a transmit antenna core according to an embodiment of the invention.

FIG. 3 illustrates a transmit antenna 115 core 310 according to an embodiment of the invention. The particular shape shown in FIG. 3 is only an exemplary embodiment of the three-dimensional core 310 that may be used for the transmit antenna 115. The three-dimensional core 310 is comprised of the closed-loop cores 210 discussed with reference to FIG. 2. In the exemplary three-dimensional core 310 shown in FIG. 3, four closed-loop cores 210 (for example, each formed of two c-cores) are grouped. As detailed below, the three-dimensional core 310 facilitates an increase in the additive effect in magnetic field noted above. Two specific embodiments are illustrated using two linear parts 320a, 320b of the core 310. While these linear parts 320a, 320b are referenced for explanatory purposes, it should be clear that coils are not always arranged around parts of the three-dimensional core 310 that are linear (e.g., when the three-dimensional core 310 is formed from a grouping of closed-loop cores). According to an embodiment A, each linear part 320a, 320b is individually wrapped with a coil 315a, 315b. The coils 315a, 315b may be formed from the same wire (though shown differently for explanatory purposes) or may be different wires fed by different sources 250. According to another embodiment B, the coil 315c may be wrapped around both linear parts 320a, 320b of the core 310 together. According to either embodiment A, B, the wrapping of the coil or coils (generally 315) around the linear parts 320a, 320b as well as the other linear parts of the core 310 or the direction of current through the coil or coils 315 is such that there is an additive effect on the magnetic field produced in the coil or coils 315a, 315b, 315c. That is, every coil 315 wrapped around the core 310 produces a magnetic field in the same direction as every other coil 315 wrapped around the core 310.

Figure 4:
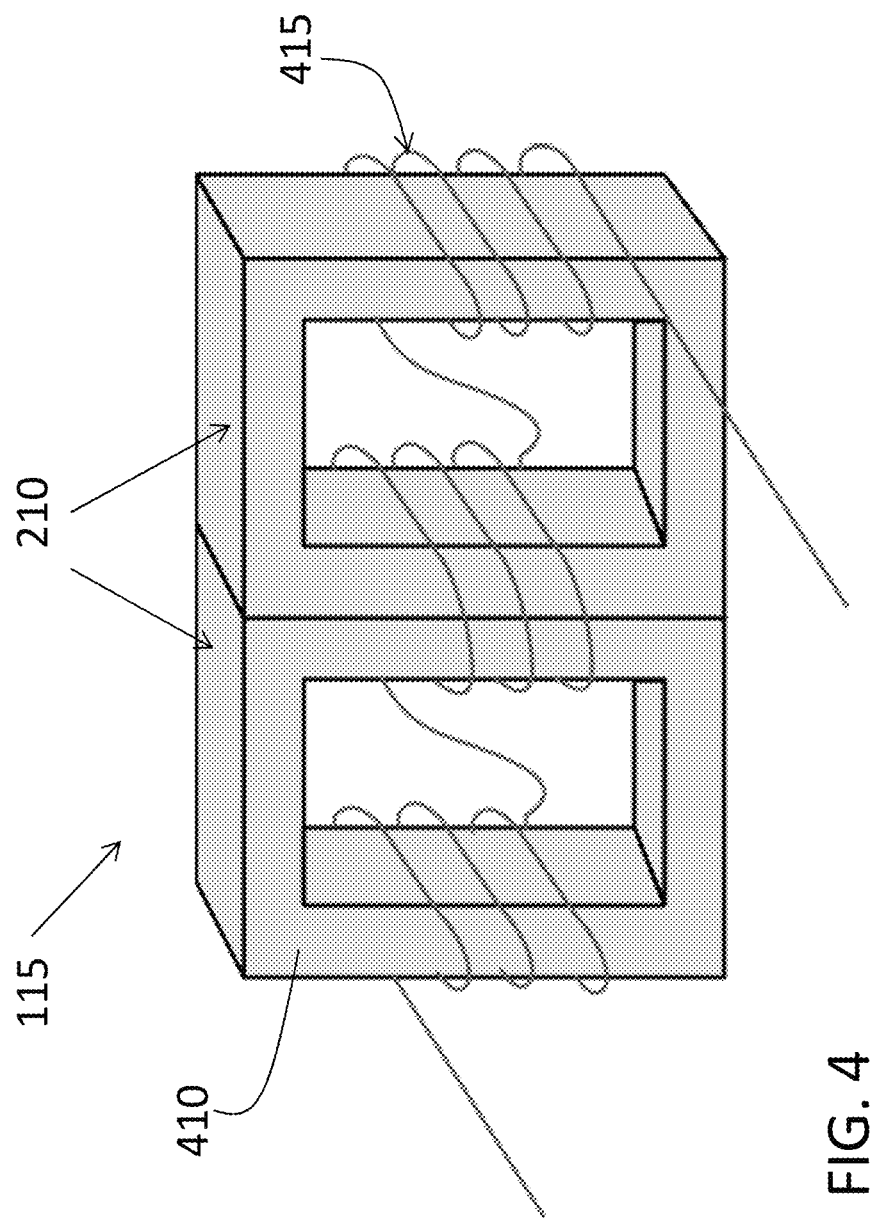
FIG. 4 illustrates a transmit antenna core according to another embodiment of the invention.

FIG. 4 illustrates a transmit antenna 115 core 410 according to another embodiment of the invention. The exemplary three-dimensional core 410 is comprised of two of the closed-loop cores 210 discussed with reference to FIG. 2. Three sets of coils 415 are shown in FIG. 4. As noted in the discussion of FIGS. 2 and 3, the three sets of coils 415 are arranged (and current is supplied) such that there is an additive effect on the magnetic field produced in each of the three sets of coils 415. It bears noting again that the antenna 115 may be part of the surface communication system 120 or may be located inside a building or in any environment in which VLF or ULF communication is desired.

Figure 5:
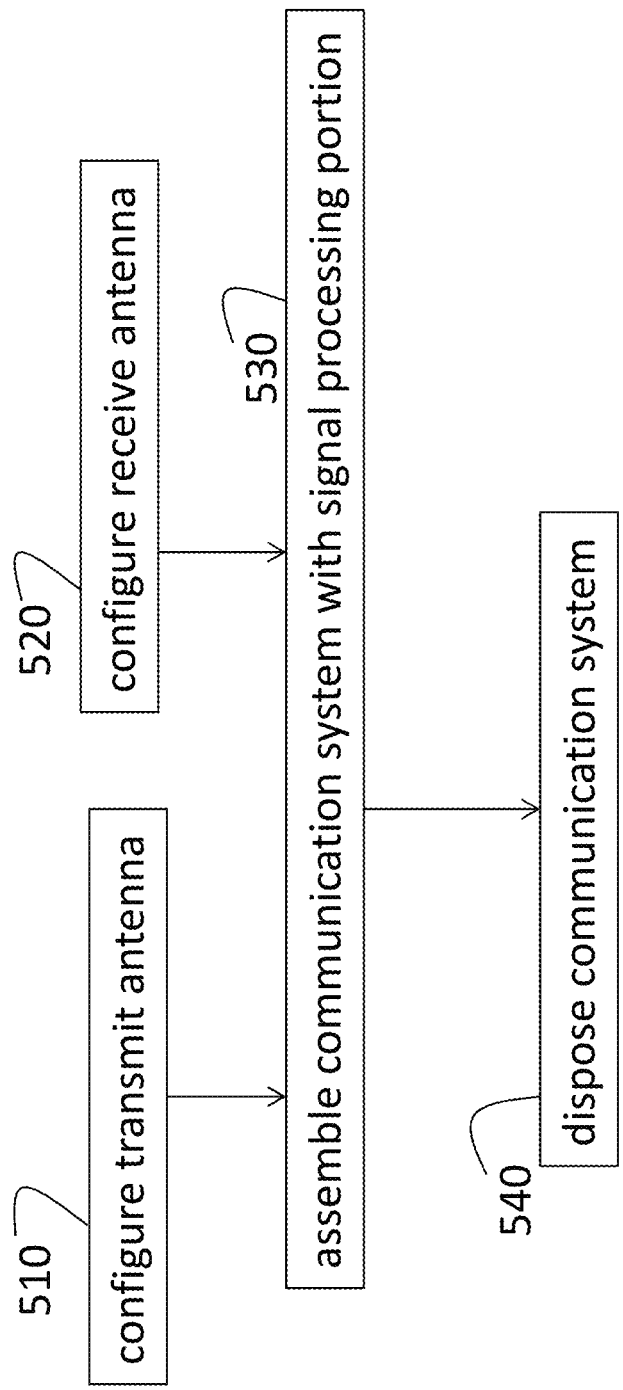
FIG. 5 is a process flow of a method of fabricating a communication system for VLF or ULF communication according to embodiments of the invention.

FIG. 5 is a process flow of a method of fabricating a communication system (e.g., subsurface communication system 110) for VLF or ULF communication according to embodiments of the invention. At block 510, configuring a transmit antenna 115 may be according to one of the embodiments detailed with reference to FIG. 2, 3, or 4 above. The transmit antenna 115 may include a closed-loop magnetic core 210 or a three-dimensional core 310, 410 formed from closed-loop magnetic cores (210). The wire 215 or coils 315, 415 of one or more wires are arranged with respect to a current source 250 (not specifically shown in FIGS. 3 and 4) such that there is an additive effect on the magnetic field generated at every part of the core 210, 310, 410. At block 520, configuring a receive antenna 125 includes winding two wires 225a, 225b around a closed-loop symmetric (e.g., toroid, c-core) core 220. The arrangement of the two wires 225a, 225b is such that the received signal is given by EQ. 1 above. At block 530, assembling the communication system (subsurface communication system 110) with the signal processing portion 113 includes configuring the signal processing portion 113 to process incoming and outgoing signals. This configuring of the signal processing portion 113 refers to including known processing elements and, additionally, a pre-amplifier and digitizer 230 and filter and conditioner 240 that output the received signal based on a combination of the voltage generated in each wire 225a, 225b of the receive antenna 125 (according to EQ. 1). At block 540, disposing the communication system may include disposing the communication system in a subsurface environment and further may include disposing the subsurface communication system 110 in an explosion proof box. In alternate embodiments, disposing the communication system (540) may include disposing the communication system in a building or other environment.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A communication system, comprising:
a transmit antenna including two or more symmetric coils wound around a closed-loop magnetic transmitter core, the transmit antenna configured to transmit an outgoing signal of very low frequency (VLF) or ultra low frequency (ULF) energy;
a receive antenna including two or more coils formed from two or more wires wound around a closed-loop magnetic receiver core, the receive antenna configured to receive transmitted VLF or ULF energy as an incoming signal; and
a processor configured to process the outgoing signal and the incoming signal, wherein the two or more coils formed from the two or more wires of the receive antenna are arranged to prevent a null signal as a received signal based on an orientation of a transmitter transmitting to the communication system.

2. The system according to claim 1, wherein the two or more symmetric coils of the transmit antenna are arranged to have an additive effect on the magnetic field generated by each of the two or more symmetric coils.

3. The system according to claim 1, wherein the transmitter core is formed from a first plurality of closed-loop magnetic cores around which a second plurality of the two or more symmetric coils are wound.

4. The system according to claim 3, wherein the first plurality and the second plurality are a different number.

5. The system according to claim 3, wherein the transmitter core is formed from four of the closed-loop magnetic cores around which four of the two or more symmetric coils are wound.

6. The system according to claim 3, wherein the transmitter core is formed from four of the closed-loop magnetic cores around which three of the two or more symmetric coils are wound.

7. The system according to claim 1, wherein the receiver core is a toroid.

8. The system according to claim 1, wherein the receive antenna includes two wires forming the two or more coils, and the processor calculates the received signal as $$D*\sqrt{A*X^2+B*X*Y+C*Y^2},$$

wherein X is a first component of the received signal resulting from one of the two wires of the receive antenna, Y is a second component of the received signal resulting from another of the two wires of the receive antenna, A, C, and D are greater than zero, and B is any real number.

9. The system according to claim 1, wherein the communication system is located in a subsurface environment to perform through the earth (TTE) communication.

10. A method of fabricating a communication system, the method comprising:
configuring a transmit antenna to include two or more symmetric coils around a closed-loop magnetic transmitter core and to the transmit an outgoing signal of very low frequency (VLF) or ultra low frequency (ULF) energy;
configuring a receive antenna to include two or more coils formed from two or more wires wound around a closed-loop magnetic receiver core and to receive an incoming signal of VLF or ULF energy;
configuring a signal processing portion to process the outgoing signal and the incoming signal; and
arranging the two or more coils formed from the two or more wires of the receive antenna to prevent a null signal as a received signal based on an orientation of a transmitter transmitting to the communication system.

11. The method according to claim 10, further comprising arranging the two or more symmetric coils of the transmit antenna to have an additive effect on the magnetic field generated by each of the two or more symmetric coils.

12. The method according to claim 10, wherein the configuring the transmit antenna includes winding a first plurality of the two or more symmetric coils around a second plurality of closed-loop magnetic cores forming a three-dimensional transmitter core.

13. The method according to claim 12, wherein the configuring the transmit antenna includes the first plurality and the second plurality being a different number.

14. The method according to claim 12, wherein the configuring the transmit antenna includes winding four of the two or more symmetric coils around four of the closed-loop magnetic cores forming the three-dimensional transmitter core.

15. The method according to claim 12, wherein the configuring the transmit antenna includes winding three of the two or more symmetric coils around two of the closed-loop magnetic cores forming the three-dimensional transmitter core.

16. The method according to claim 10, wherein the configuring the receive antenna includes configuring the receiver core as a toroid.

17. The method according to claim 10, wherein the configuring the receive antenna includes forming the two or more coils with two wires, and the configuring the signal processing portion to process the incoming signal includes the signal processing portion calculating the received signal as $$D*\sqrt{A*X^2+B*X*Y+C*Y^2},$$

wherein X is a first component of the received signal resulting from one of the two wires of the receive antenna, Y is a second component of the received signal resulting from another of the two wires of the receive antenna, A, C, and D are greater than zero, and B is any real number.

18. The method according to claim 10, further comprising housing the transmit antenna in an explosion proof box in a subsurface environment to perform through the earth (TTE) communication.

* * * * *